Patented Jan. 20, 1942

2,270,454

UNITED STATES PATENT OFFICE 2,270,454

DISAZO DYESTUFFS AND THEIR MANUFACTURE

Adolf Krebser, Riehen, near Basel, and Werner Bossard, Basel, Switzerland, assignors to the firm J. R. Geigy A. G., Basel, Switzerland No Drawing. Application November 7, 1940, Serial No. 364,754. In Switzerland December 11, 1939

8 Claims. (Cl. 260—190)

It has been found that new valuable disazo dyestuffs coloring the animal fibre of blue to blue-black shades are obtained by combining a diazotised amino-diarylsulfone of the benzene series with a 1-amino-naphthalene compound coupling in 4-position, further diazotising the thus obtained aminoazo dyestuff and coupling it with a 1-N-alkyl or -N-aryl aminonaphthalene-8-sulfonic acid, whereby the first two components are so chosen that the aminoazo dyestuff only contains one sulfonic acid group. As aminodiarylsulfone compounds there come for example into question the 6- or 4-methyl- or -methoxy - 3 - aminodiphenylsulfone- 3'-sulfonic acid, 6- or 4-chloro-3-aminodiphenylsulfone-3'-sulfonic acid, 3-aminodiphenylsulfone-3'-sulfonic acid, 4'-methyl-2-aminodiphenylsulfone-4-sulfonic acid and so on or the corresponding compounds free from sulfonic acid groups. The diarylsulfone-sulfonic acids of the benzene series, as far as their manufacture is not yet known, are made by condensation of the correspondingly substituted nitro-benzene-sulfo-chlorides with hydrocarbons of the benzene series according to Friedel-Crafts, further by sulfonation at 50° C. of the obtained nitrodiarylsulfones, as known, with fuming sulfuric acid (20% of $SO_3$) and by reduction of the nitro group with iron and hydrochloric acid. As middle components there are to be named: 1-aminonaphthalene, 1-aminonaphthalene-6- or -7-sulfonic acid or their mixture and so on.

As 1-N-substituted aminonaphthalene-8-sulfonic acids which are made according to usual methods may be cited the following acids: 1-phenylaminonaphthalene-8-sulfonic acid, 1-p-tolyl- or -p-phenetidylaminonaphthalene-8-sulfonic acid, 1-ethyl- or -methylaminonaphthalene-8-sulfonic acid and so on.

Similar dyestuffs with aniline or metanilic acid as first component are already known. The new dyestuffs according to the present process show, as compared with the said similar dyestuffs, a considerably better fastness to fulling, sea-water and light.

The present invention is illustrated by the following examples, the parts being by weight, where nothing other is said.

Example 1

32.7 parts of 4-methyl-3-aminodiphenylsulfone-3'-sulfonic acid are dissolved neutral in 100 parts of water with 5.4 parts of sodium carbonate, then mixed with 6.9 parts of sodium nitrite and the whole is caused to flow at 3° to 5° C. into 29.2 parts of hydrochloric acid of 30% strength. The diazotisation being finished the mixture is, as usual, coupled with 14.3 parts of 1-aminonaphthalene. The obtained monoazo dyestuff is just made alkaline to litmus by means of sodium carbonate, then 7.2 parts of nitrite and 85 parts of hydrochloric acid of 30% strength are added thereto for diazotizing purposes. The diazo compound which is difficultly soluble is filtered off, dispersed in 400 parts of water and coupled, in presence of 45 parts of sodium acetate, with 29.5 parts of 1-phenylaminonaphthalene-8-sulfonate of sodium in an acetic acid solution. The dried dyestuff constitutes a dark powder. It dissolves in sulfuric acid as well as in water with deep blue coloration and dyes wool, from a weakly acid bath, of navy-blue shades of excellent fastness to fulling, sea-water and light.

Dyestuffs of similar properties are obtained by using 6-methyl-3-aminodiphenylsulfone-3'-sulfonic acid instead of 4-methyl-3-aminodiphenylsulfone-3'-sulfonic acid and 1-p-tolyl- or 1-p-phenetidylaminonaphthalene-8-sulfonic acid instead of 1-phenylaminonaphthalene-8-sulfonic acid.

Example 2

24.7 parts of 4-methyl-3-aminodiphenylsulfone are diazotised as usual and coupled in an acetic acid solution with 22.3 parts of Cleve acid mixture. The obtained monoazo dyestuff is made weakly alkaline with sodium carbonate, then diazotized by means of 7.2 parts of sodium nitrite and 85 parts of hydrochloric acid of 30% strength poured therein at 8° to 10° C. The diazotisation being finished, there is filtered off and coupled, as indicated in Example 1, with 31.3 parts of 1-p-tolylaminonaphthalene-8-sulfonic acid. The dried dyestuff constitutes a dark powder. It dissolves in water with reddish-blue coloration, in sulfuric acid with blue coloration and dyes wool of blue-black shades.

Instead of 4-methyl-3-aminodiphenylsulfone there may be also used as first component 4-methoxy- or 6-methyl-3-aminodiphenylsulfone or 3-amino-2':4':5'-trichlorodiphenylsulfone. The thus obtained dyestuffs possess similar properties.

Example 3

34.7 parts of 6-chloro-3-aminodiphenylsulfone-3'-sulfonic acid are diazotised as indicated in Example 1. A solution of 14.3 parts of 1-aminonaphthalene in 150 parts of water and 14 parts of hydrochloric acid of 30% strength being just acid to Congo red is allowed to run into the well cooled diazo compound. The hydrochloric acid is then gradually neutralised with 11.5 parts of sodium acetate and the acetic acid with 11 parts of sodium carbonate. The thus obtained monoazo dyestuff is diazotised as described in Example 1 and coupled with 29.5 parts of 1-phenylaminonaphthalene-8-sulfonic acid. The coupling being finished, the dyestuff is salted out, filtered and dried. It constitutes a black powder which dissolves in water and sulfuric acid with greenish-blue color and dyes wool of flowery pure blue shades of good fastness properties.

If instead of 6-chloro-3-aminodiphenylsulfone-3'-sulfonic acid the corresponding 4-chlorosubstituted compound is used, a more yellowish dyestuff of similar properties is obtained.

*Example 4*

32.7 parts of 4'-methyl-2-aminodiphenylsulfone-4-sulfonic acid are dissolved in 150 parts of water with 5.6 parts of sodium carbonate, then there are added thereto 6.9 parts of nitrite and 30 parts of hydrochloric acid poured in at 3-5° C. The diazotisation being finished, the mixture is coupled as in the above examples with 14.3 parts of α-naphthylamine. The monoazo dyestuff is made alkaline with 6 parts of sodium carbonate, then intermixed with 7.1 parts of sodium nitrite and diazotised at 8° C. by pouring thereinto 90 parts of hydrochloric acid of 30% strength. The brown diazo body is filtered and coupled as usual with 31.3 parts of 1-p-tolylaminonaphthalene-8-sulfonic acid. The coupling is soon finished, whereupon the dyestuff is salted out with common salt, filtered and dried.

It constitutes a dark powder and dissolves in water and sulfuric acid with a deep blue coloration. Dyed on wool it gives beautiful blue shades of excellent properties.

What we claim is:

1. The disazo dyestuffs having in the free state the following formula:

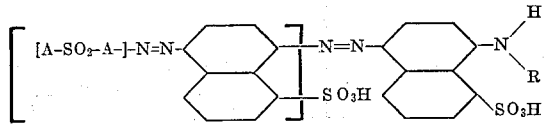

wherein A means two radicals of the benzene series and R a radical of the group consisting of alkyl radicals and aryl radicals of the benzene series, said dyestuffs being dark powders, soluble in water, dyeing the animal fibre blue to bluish-black shades of excellent fastness to milling, sea-water and light.

2. The disazo dyestuffs having in the free state the following formula:

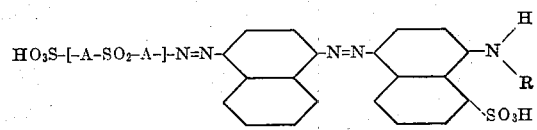

wherein A means two radicals of the benzene series and R a radical of the group consisting of alkyl radicals and aryl radicals of the benzene series, said dyestuffs being dark powders, soluble in water, dyeing the animal fibre blue to bluish-black shades of excellent fastness to milling, sea-water and light.

3. The disazo dyestuffs, having in the free state the following formula

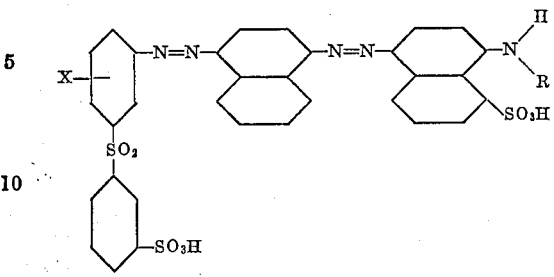

wherein X means one of the group consisting of H, Cl and $CH_3$ and R means a radical selected from the group consisting of alkylradicals and arylradicals of the benzene series, said dyestuffs being dark powders, soluble in water, dyeing the animal fibre blue to bluish-black shades of excellent fastness to milling, sea-water and light.

4. The disazo dyestuffs, having in the free state the following formula

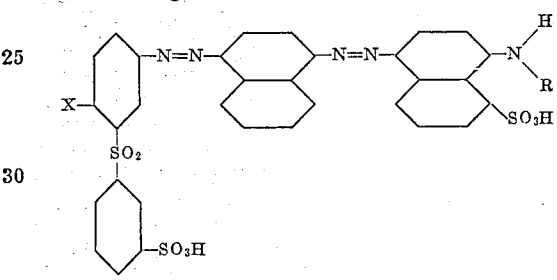

wherein X means one of the group consisting of H, Cl and $CH_3$ and R means a radical selected from the group consisting of alkylradicals and arylradicals of the benzene series, said dyestuffs being dark powders, soluble in water, dyeing the animal fibre blue to bluish-black shades of excellent fastness to milling, sea-water and light.

5. The disazo dyestuff having in the free state the following formula

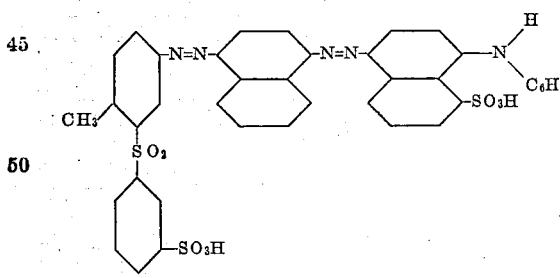

being a dark powder, soluble in water and concentrated sulfuric acid with deep blue color, dyeing animal fibres from a weakly acid bath navy blue shades of excellent fastness to milling, seawater and light.

6. The disazo dyestuff having in the free state the following formula

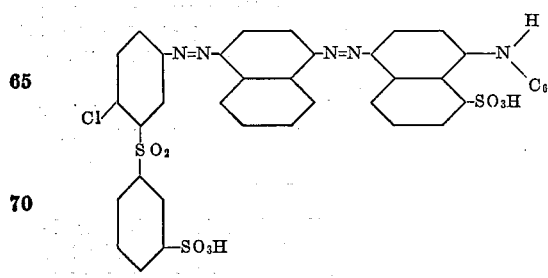

being a black powder soluble in water and concentrated sulfuric acid with greenish blue color and dyeing animal fibres from a weakly acid bath rich blue shades of excellent fastness to milling, sea-water and light.

7. The disazo dyestuff having in the free state the following formula

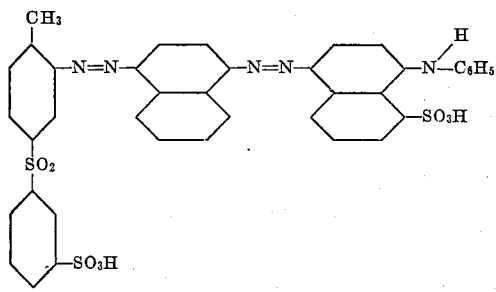

being a dark powder, soluble in water and concentrated sulfuric acid with deep blue color and dyeing animal fibres from weakly acid bath beautiful blue shades of excellent fastness properties.

8. A process for the manufacture of disazo dyestuffs, comprising coupling a diazotised aminodiaryl-sulfone of the benzene series with an 1-amino-naphthalene compound capable of coupling in 4-position, the aminodiaryl-sulfone and the aminonaphthalene compound being so selected that the resulting aminoazodyestuff contains only one sulfonic acid group, diazotising the aminoazodyestuff thus obtained and coupling the diazo-compound with a 1-aminonaphthalene-8-sulfonic acid selected from the group consisting of 1-alkylaminonaphthalene-8-sulfonic acid and 1-arylaminonaphthalene-8-sulfonic acid, aryl meaning a radical of the benzene series.

ADOLF KREBSER.
WERNER BOSSARD.